United States Patent
Toren (10) Patent No.: US 11,811,710 B1
(45) Date of Patent: Nov. 7, 2023

(54) METHOD AND SYSTEM FOR MULTI-FORMAT MESSAGING

(71) Applicant: Sunbird Messaging Inc, Tenafly, NJ (US)

(72) Inventor: Garin Toren, New York, NY (US)

(*) Notice: Subject to any disclaimer, the term of this patent is extended or adjusted under 35 U.S.C. 154(b) by 0 days.

(21) Appl. No.: 17/887,965

(22) Filed: Aug. 15, 2022

Related U.S. Application Data (60) Provisional application No. 63/356,882, filed on Jun. 29, 2022, provisional application No. 63/351,788, filed on Jun. 13, 2022.

(51) Int. Cl.
| | | |
|---|---|---|
| *H04L 51/04* | (2022.01) | |
| *H04L 51/56* | (2022.01) | |
| *G06F 9/54* | (2006.01) | |
| *H04L 51/21* | (2022.01) | |

(52) U.S. Cl.
CPC .............. *H04L 51/04* (2013.01); *G06F 9/541* (2013.01); *H04L 51/21* (2022.05); *H04L 51/56* (2022.05)

(58) Field of Classification Search
CPC ......... H04L 51/04; H04L 51/21; H04L 51/56; G06F 9/541
See application file for complete search history.

(56) References Cited

U.S. PATENT DOCUMENTS

| | | | | |
|---|---|---|---|---|
| 2004/0255015 | A1* | 12/2004 | Fitzpatrick | H04L 9/40 709/223 |
| 2012/0231770 | A1* | 9/2012 | Clarke | G06F 3/048 455/414.1 |
| 2015/0067065 | A1* | 3/2015 | Dolph | H04L 51/58 709/206 |
| 2020/0387995 | A1* | 12/2020 | Bucciarelli | H04W 4/16 |
| 2021/0136028 | A1* | 5/2021 | Clarke | H04L 51/02 |
| 2023/0074455 | A1* | 3/2023 | Pinchuk | G06F 21/606 |

FOREIGN PATENT DOCUMENTS

KR    20100134995 A   * 12/2010

\* cited by examiner

*Primary Examiner* — Austin J Moreau (57) ABSTRACT

A first instance of a first messaging application, with a first messaging format, is running on a virtual machine. A user authentication for a first user account associated with the first instance is received from a user of a second messaging application with a second messaging format. A second user account associated with the second messaging application is linked to the first user account based on the authentication. A first database associated with the first user account is monitored for incoming messages from a second instance of the first messaging application which are then stored in a second database associated with the second user account based on an API to convert them to the second messaging format. The second database is monitored for outgoing messages from the second messaging application which are then stored in the first database based on an API to convert them to the first messaging format.

20 Claims, 7 Drawing Sheets

METHOD AND SYSTEM FOR MULTI-FORMAT MESSAGING

CROSS-REFERENCE TO RELATED APPLICATIONS

This application claims the benefit of priority to U.S. provisional application Ser. No. 63/351,788, filed on Jun. 13, 2022, and U.S. provisional application Ser. No. 63/356,882, filed on Jun. 29, 2022 the contents of each of which are hereby incorporated by reference.

TECHNICAL FIELD

The present disclosure relates generally to messaging between messaging applications that use different message formats, and more specifically to utilizing a virtual machine to assist the multi-format messaging by running an instance of one of the messaging applications.

BACKGROUND

Many electronic communication services exist for individuals that desire to communicate electronically making it more difficult for users to identify compatible methods by which to communicate. For example, a person may have multiple user accounts for different types of communication services (e.g., messaging) and may prefer some of these services over others. This may become an issue when attempting to communicate with other users of different communication services because a common service may need to be identified in order to communicate most effectively and/or conveniently over the disparate communication services with which the users may have accounts. Furthermore, even when a communication service is capable of communicating with another user, it may not be optimal due to constraints and/or limitations for communicating (e.g., limited to a certain message size or audio/image quality) that other available communication services may not have. These issues are especially noticeable in the area of Instant Messaging (IM) with a large number of IM products (e.g., WhatsApp Messenger) each having their own proprietary (and often incompatible) software clients. Still further, the plurality of social media IM messaging services (e.g., Facebook (Meta) Messenger) has also highlighted the importance of these compatibility issues.

Instant messaging (IM) refers to communication technologies used for text-based communication (although audio/video may also be available) between two (private messaging) or more (chat room) participants over a communication network (e.g., the Internet). Instant messaging differs from other communication technologies (e.g., email) because of the near instant speed of the communications between the users. IM may allow for nearly immediate receipt of acknowledgments or replies. Furthermore, IM may also allow for conversations to be saved for later reference (e.g., logged in a local message history) so that the messages are persistent like other formats (e.g., emails).

IM services may use the client-server model wherein the clients must first connect to a central IM server. Each different IM service may use its own distinct client (e.g., separately installed software application or browser-based application). The IM clients normally only work within the same IM network, although some IM clients may allow limited functionality with other IM services. Some examples of IM services are: WhatsApp, Facebook Messenger, WeChat, QQ Messenger, Telegram, Viber, Line, iMessage, and Snapchat. Some IM services use a network model with no servers and their IM network may include only client devices. Examples of server-less IM services are: RetroShare, Tox, Bitmessage, Ricochet, and Ring.

An instant message service center (IMSC) may deliver messages in a mobile telephone network so that when a first user sends an IM to a second user, the mobile phone of the first user sends the IM to the IMSC, the IMSC may then store the message and then deliver it to the second user when possible. The IMSC may have a time limit for storing the message.

SUMMARY

As noted above, the large number of available communication services has led to the communication experience of many users being fragmented and/or restrictive. The freedom to communicate (e.g., message) equally well with anyone regardless of their preferred messaging format is not possible with currently available communications services. For example, message conversations remain organized according to their particular communications formats, so that users have to account for multiple conversations (e.g., message threads) across a variety of messaging applications on their computing devices. This may result in ineffective and/or inefficient communications between users of different messaging applications with different messaging formats. For example, a conversation between two users may begin over a first messaging format (e.g., iMessage) and then a third user may be contacted by one (or both) of the initial two conversers via a second messaging format (e.g., Android messaging). Therefore, the entire conversation between the three users may no longer be tracked, reviewed, searched, or archived by a single messaging application because of the variety of distinct messaging formats.

However, a multi-format, contact-centric grouping of messages could be useful for integrating multi-format communications. Having the messages all grouped/categorized by contact may help users to more efficiently manage the volume of incoming messages (e.g., in any format) on their computing devices (e.g., smartphones). Additionally, such a grouping of messages may make it easier for a user to delete, block, or take other types of actions with respect to messages or groups of messages from a particular contact.

The subject matter of the present disclosure is directed to mitigating and/or overcoming one or more of the messaging compatibility problems set forth above. To address these and other issues, methods, systems, and instrumentalities for multi-format communications (e.g., messaging) using a virtual machine are provided and described herein.

Provided is a computer implemented method to be carried out with a processor and a memory, comprising: executing a first instance of a first messaging application, with a first messaging format, on a virtual machine server. Receiving a user authentication for a first user account associated with the first instance of the first messaging application from a user of a second messaging application with a second messaging format. Linking a second user account associated with the second messaging application to the first user account based on the authentication. The linking may include monitoring a first database associated with the first user account for incoming messages from a second instance of the first messaging application. The incoming messages may then be stored in a second database associated with the second user account based on an application programming interface (API) to convert the incoming messages to the second messaging format. A notification of the incoming messages may then be sent to the second messaging application. The linking may further include monitoring the second database for outgoing messages from the second messaging application. The outgoing messages may then be stored in the first database based on an API to convert the outgoing messages to the first messaging format.

In some embodiments described herein the storing of the messages in the first database and the storing of the messages in the second database further comprises encrypting the messages before storing them in the respective databases.

In some embodiments described herein the monitoring of the second database for outgoing messages comprises checking for the outgoing messages in the second database according to a schedule (e.g., every thirty seconds or every five minutes).

Provided is a computer implemented method to be carried out with a processor and a memory, comprising: copying the incoming messages from the second database to the second messaging application based on receipt of the notification; copying the outgoing messages from the first database to the first instance of the first messaging application; and sending the outgoing messages to the second instance of the first messaging application.

Provided is a computer implemented method to be carried out with a processor and a memory, comprising: deleting the incoming messages from the first database based on the storing of the incoming messages in the second database; and deleting the outgoing messages from the second database based on the storing of the outgoing messages in the first database.

Provided is a computer implemented method to be carried out with a processor and a memory, comprising: deleting the incoming messages from the second database based on the copying of the incoming messages; and deleting the outgoing messages from the first database based on the sending of the outgoing messages.

In some embodiments described herein the authentication comprises at least one of a username, an email address, and a password. Furthermore, the authentication may comprise a two-factor authentication.

Provided is a computer implemented method carried out with a processor and memory, comprising: storing the at least one of a username, an email address, and a password in the second database; copying the at least one of a username, an email address, and a password from the second database to the virtual machine server; and deleting the at least one of a username, an email address, and a password from the second database based on their respective copying.

In some embodiments described herein the storing of the at least one of a username, an email address, and a password in the second database further comprises encrypting the at least one of a username, an email address, and a password.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

As noted above, users of messaging services may first have to choose a compatible message format before composing a message or selecting a desired contact for messaging. For example, a user may have to launch a specific messaging application with a specific message format before composing a message to a specific contact for whom the specific message format is a preferred or even the only acceptable message format. With the multi-format messaging techniques for using a virtual machine to assist in overcoming compatibility issues, as described herein, however, the user experience when messaging may be much more fluid and efficient. As an initial matter, the user of a multi-format messaging application (e.g., second messaging 104 of FIG. 1 as described below) application may simply select a desired contact for messaging and may then compose an outgoing message (e.g., in the native format of the multi-format messaging application, such as the Android messaging format) without considering whether the selected contact prefers (or is even capable of) receiving messages in the native messaging format. The multi-format messaging methods, systems and instrumentalities may then handle the delivery of the message to the selected contact in a compatible message format (e.g., selected based on information regarding the selected contact in the user's contact list) as described below with respect to the accompanying figures.

System

Figure 1:
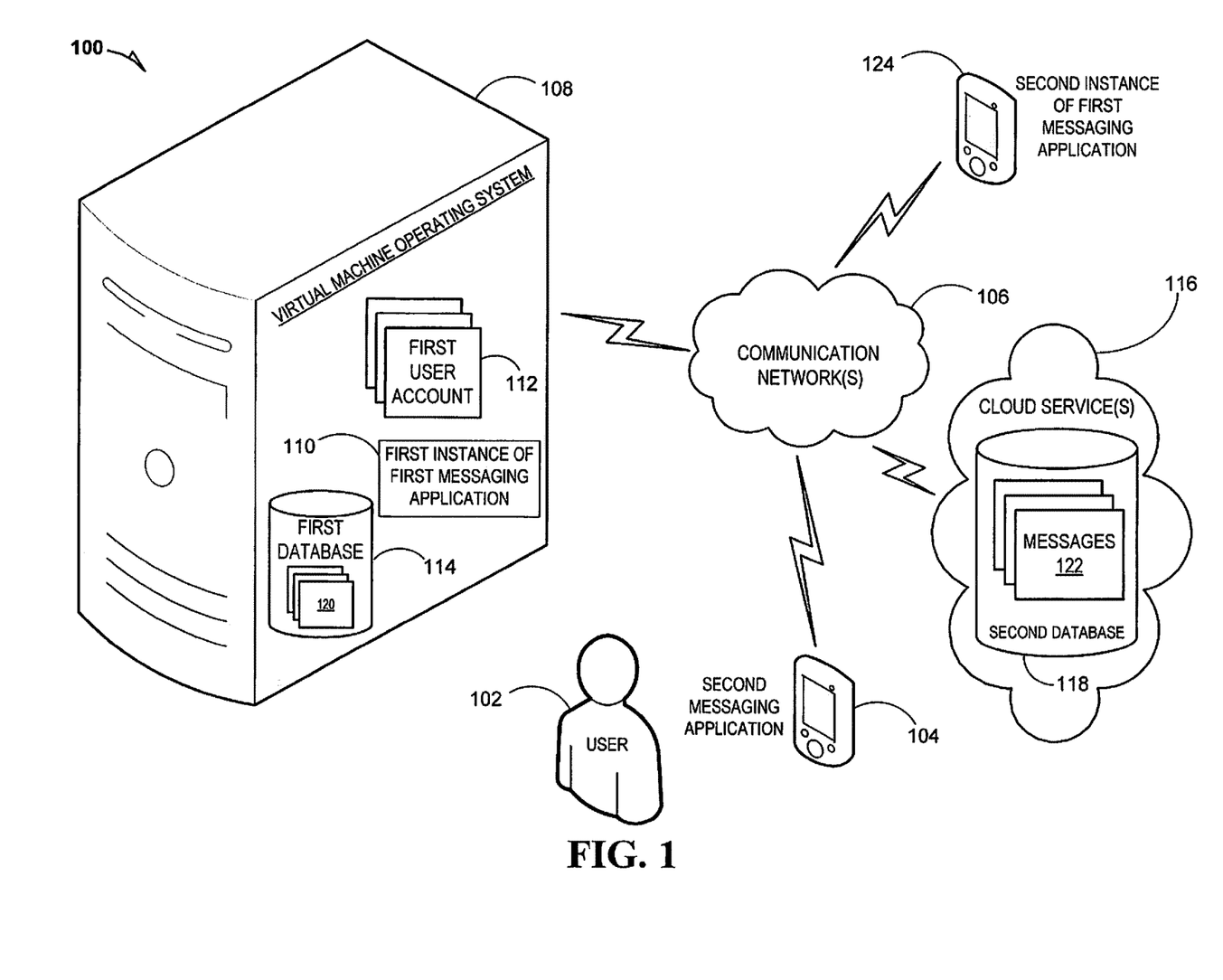
FIG. 1 is a use-case diagram showing a system, consistent with some embodiments described herein, for multi-format messaging using a virtual machine server.

FIG. 1 is a use-case diagram showing a system 100, consistent with some embodiments described herein, for multi-format messaging using a virtual machine server 108.

As illustrated in FIG. 1, a computer implemented method for multi-format messaging may be carried out by system 100. A user 102 of a second messaging application 104, with an associated second messaging format (e.g., Android messaging format), may desire to communicate (e.g., over communication network(s) 106) with a user of a first messaging application with an associated first messaging format (e.g., Apple messaging format). The second messaging application 104 may be running on a compatible operating system (e.g., Android OS) on a computing device of user 102 who may be logged in to a second user account associated with the second messaging application 104 (e.g., an Android OS user account). The user 102 may then select, from a list of contacts available in a user interface (UI) of the second messaging application 104 (e.g., as described below with respect to FIGS. 2-3), a contact associated with the user of the first messaging application with the first message format. The second messaging application 104 may then present user 102 with a user account authentication screen in the UI based on the contact selection. The user account authentication screen may show user accounts associated with distinct messaging applications and their respective message formats for user 102 to select (e.g., to select the first messaging application) or it may simply show the user account for the first messaging application if it is associated with the selected contact as the preferred (or only) message format for communication with the user of the first messaging application. The displayed user accounts may be accounts of user 102 with operating systems (e.g., Mac OS) that execute the respective messaging applications (e.g., iMessage) that use each of the different message formats. The user 102 may then select the user account associated with the first messaging application (e.g., a first user account 112 for an operating system that runs the first messaging application) in order to login to the selected user account from the UI of the second messaging application 104.

However, the user 102 would not normally be able to login to an account associated with a different operating system (e.g., Mac OS) than the operating system (e.g., Android OS) that is running the second messaging application 104. In order to address this issue, a first instance of the first messaging application 110 may be running on a virtual machine server 108 (e.g., a bare metal server running a virtual machine operating system). A host virtual machine (host VM) is the server component of a VM, the hardware that provides the computing resources to support a particular guest virtual machine (guest VM) which is the software component of the VM with an operating system like, for example, Mac OS. The host VM and the guest VM together make up a VM server like the VM server 108. When the user 102 selects the first user account 112 associated with the first messaging application, a vacant user account in the VM operating system may be assigned to user 102 for authentication of the user 102's credentials with the VM operating system (e.g., Mac OS email and password). The user 102 may then provide the user authentication information for the first user account 112 associated with the first messaging application through the UI of the second messaging application 104. In some embodiments described herein the authentication may include at least one of a username, an email address, and a password. Furthermore, the authentication may comprise a two-factor authentication (e.g., two of a username, an email address, and a password).

The authentication information (e.g., at least one of a username, an email address, and a password) may then be stored, by the second messaging application 104, in a second database 118 that may be available as part of cloud service(s) 116 (e.g., Firebase, a Google Cloud database). In some embodiments, the authentication information may be encrypted by the second messaging application 104 before it is stored in the second database 118. The VM server 108 may then copy the authentication information from the second database 118 and use it to login to the first user account 112 (e.g., a Mac OS account) associated with the first instance of the first messaging application 110. The VM server 108 may then delete the authentication information from the second database 118, based on the authentication information being copied, so that the authentication information may be stored in the second database 118 for only a very short period of time (e.g., milliseconds).

The second user account associated with the second messaging application 104 may then be linked (e.g., by VM server 108) to the first user account 112 associated with the first instance of the first messaging application 110 (e.g., linked in the second database 118) based on the authentication. The VM server 108 may execute specialized software (e.g., outside of the VM operating system) for this purpose, such as an application for aggregating data (e.g., messages 122) from two linked data sources (e.g., the first instance of the first messaging application 110 and the second messaging application 104). The linking of the two user accounts (e.g., both associated with user 102) may further include monitoring (e.g., checking periodically by VM server 108) a first database 114 (e.g., within the virtual machine operating system) associated with the first user account 112 (e.g., and with the first instance of the first messaging application 110) for incoming messages (e.g., stored in the first message format as messages 120 associated with the first user account 112) from a second instance of the first messaging application 124 (e.g., the application being used by the person associated with the contact selected by user 102 above). Although the incoming messages are in the first message format, they may be stored in the second database 118 associated with the second user account (e.g., and with the second messaging application 104) based on an application programming interface (API) used to convert the incoming messages from the first message format to the second message format (e.g., stored in the second message format as messages 122 associated with the second user account). The VM server 108 may execute specialized software (e.g., outside of the VM operating system) for this purpose, such as an application for building APIs (e.g., the Postman API platform). A notification (e.g., a push notification) of the incoming messages being stored in the second database 118 may then be sent (e.g., by VM server 108) to second messaging application 104.

The linking of the first and second user accounts may also include monitoring (e.g., checking periodically by VM server 108) the second database 118 for outgoing messages from the second messaging application 104 (e.g., stored as messages 122 in the second database 118). Although the outgoing messages are in the second message format, they may be stored in the first database 114 based on an API to convert the outgoing messages to the first messaging format (e.g., stored in the first message format as messages 120 associated with the first user account 112). As noted above, the VM server 108 may execute specialized software (e.g., outside of the VM operating system) for this purpose.

In some embodiments described herein, the storing of the messages 120 in the first database 114 and the storing of the messages 122 in the second database 118 may further comprise encrypting the messages 120 and 122 before storing them in the respective first database 114 and second database 118.

In some embodiments described herein, the monitoring of the second database 118 for outgoing messages (e.g., stored as part of messages 122) comprises checking for the outgoing messages in the second database 118 according to a schedule (e.g., every thirty seconds or every five minutes). The monitoring of the first database 114 may be virtually continuous since the first database 114 may be internal to the virtual machine operating system of the VM server 108.

The linking of the first and second user accounts may further include sending the respective incoming messages and outgoing messages to their intended recipients (e.g., user 102 and the person associated with the contact selected by user 102 above). The incoming messages may be copied from the second database 118 (e.g., they are stored as part of messages 122) to the second messaging application 104 (of user 102) based on receiving the notification of the incoming messages (e.g., from VM server 108). Furthermore, the outgoing messages may be copied from the first database 114 (e.g., they are stored as part of messages 120) to the first instance of the first messaging application 110 which may then send the outgoing messages to the second instance of the first messaging application 124 (e.g., of the person associated with the contact selected by user 102 above). The second instance of the first messaging application 124 may therefore communicate with the second messaging application 104 (e.g., user 102 communicates with selected contact) via the intermediary first instance of the first messaging application 110 (associated with the first user account 112) so that any messaging capabilities that are exclusive to the first messaging application may be preserved. For example, an instance of the first messaging application may allow for certain message features only when messaging with another instance of the first messaging application, such as: encryption, text over Wi-Fi, increased number of characters in a message, no cost for certain messages (e.g., international), enhanced audio/video quality, can message with more device types, allows for "reactions" to messages and/or message quoting, see if a message has been read, adding effects to messages, and/or addition of other indicia associated with being a user of the first messaging application (e.g., certain colors in parts of the messages).

In some embodiments, the incoming messages and outgoing messages may be stored in the first database 114 and the second database 118 (e.g., as part of messages 120 and 122) for only a very short period of time, so that the second instance of the first messaging application 124 and the second messaging application 104 are the only longer term storage possibilities for these messages (e.g., as long as the users don't delete them). For this purpose, the incoming messages may be deleted from the first database 114 based on the storing of the incoming messages in the second database 118, and the outgoing messages may be deleted from the second database 118 based on the storing of the outgoing messages in the first database 114. Furthermore, the incoming messages may be deleted from the second database 118 based on the copying of the incoming messages and the outgoing messages may be deleted from the first database 114 based on the sending of the outgoing messages to the second instance of the first messaging application 124.

User Interface

Figure 2:
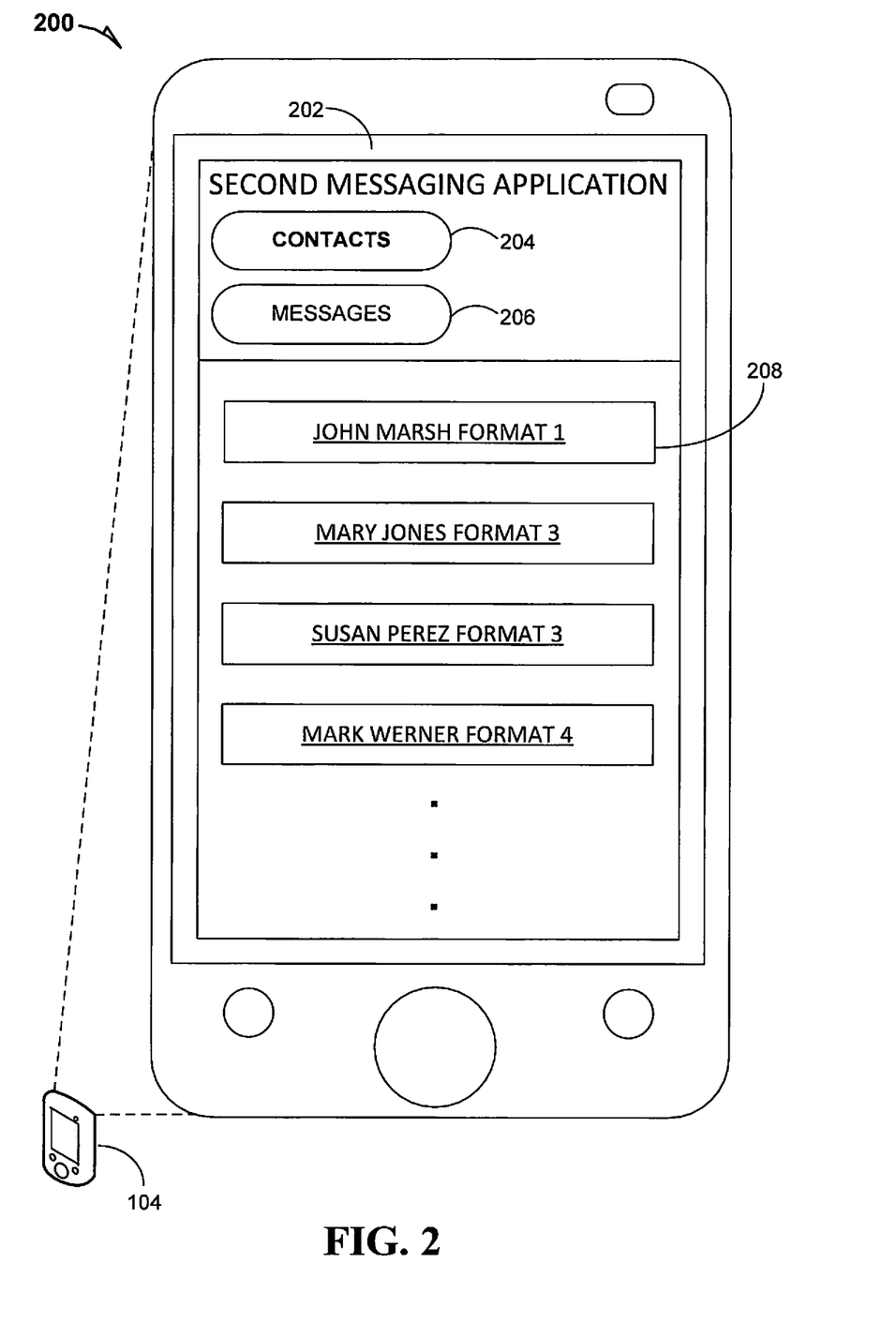
FIG. 2 is a block diagram illustrating an example contacts user interface (UI) of a messaging application, consistent with some embodiments described herein, for multi-format messaging using a virtual machine server.

FIG. 2 is a block diagram 200 illustrating an example contacts user interface (UI) 202 of a messaging application, consistent with some embodiments described herein, for multi-format messaging using a virtual machine server (e.g., VM server 108 of FIG. 1).

As described above, a user (e.g., user 102 of FIG. 1) of a multi-format messaging application (e.g., second messaging application 104 of FIG. 1, also shown in FIG. 2), with an associated second messaging format (e.g., Android messaging format), may desire to communicate (e.g., send/receive messages) with a user of a first messaging application (e.g., iMessage) with an associated first messaging format (e.g., Apple messaging format). The second messaging application 104 may be running on a compatible operating system (e.g., Android OS) on a computing device of the user, who may be logged in to a second user account associated with the second messaging application 104 (e.g., an Android OS user account). The user may then select, from a list of contacts available in a contacts user interface (UI) 202 of the second messaging application 104, a contact 208 associated with the user (e.g., John Marsh) of the first messaging application with the first message format (e.g., format 1). Also as described above, the user may then be presented with a user account authentication UI (not shown) in order to login to an account associated with the first messaging application based on the selection of the contact that is associated with a user of the first messaging application.

The user account presented for the authentication may be an account of user 102 with an operating system (e.g., Mac OS) that executes the respective messaging application (e.g., iMessage) that uses the first messaging format (e.g., a first user account 112 of FIG. 1 for an operating system that runs the first messaging application). The user 102 may then login to the user account associated with the first messaging application by providing the requested login credentials (e.g., at least one of a username, an email address, and a password). As noted above, the user would not be able to log into this user account associated with the first messaging application from the second messaging application 104 without the multi-format messaging techniques described herein for using a virtual machine server (e.g., VM server 108 of FIG. 1).

Once the user has logged into the first user account the user may begin messaging with the selected contact 208 via an instance of the first messaging application running on a VM server (e.g., the first instance of first messaging application 110 running on VM server 108 of FIG. 1) that messages with the instance of the first messaging application used by contact 208 (second instance of first messaging application 124 of FIG. 1). A contacts button 204 may be bolded (e.g., or otherwise visually distinguished) to indicate that the contacts UI 202 is currently being shown. A messages button 206 may be available to access a contact-centric messages UI (e.g., UI 302 of FIG. 3 described below) that may allow the user to navigate distinct message threads based on the one or more contacts (e.g., contact 208) involved in the message threads instead of being based on the messaging applications or messaging formats used for the messages that make up the message thread.

Figure 3:
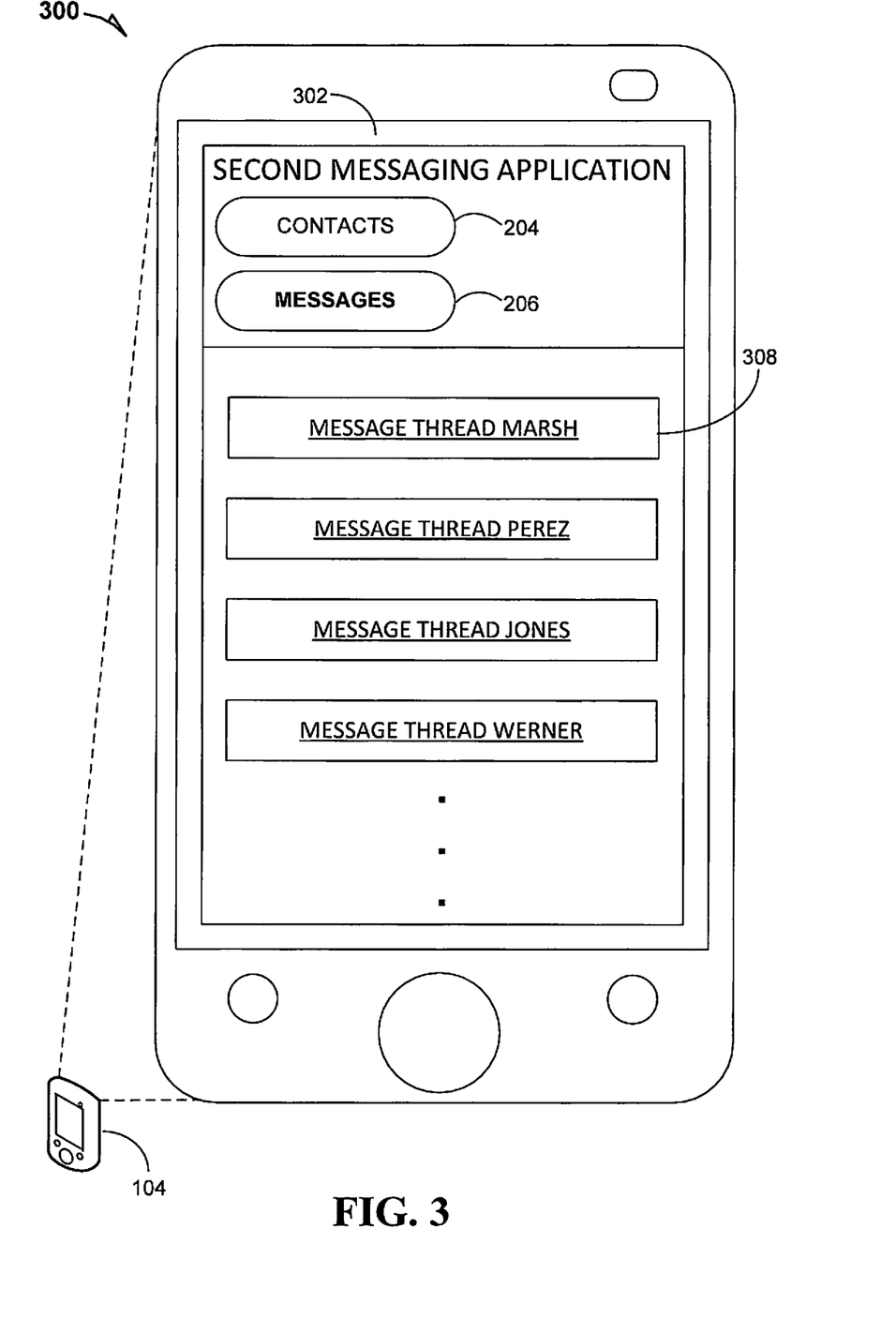
FIG. 3 is a block diagram illustrating an example user accounts UI of the messaging application, consistent with some embodiments described herein, for multi-format messaging using a virtual machine server.

FIG. 3 is a block diagram illustrating an example messages UI 302 of the messaging application, consistent with some embodiments described herein, for multi-format messaging using a virtual machine server (e.g., VM server 108 of FIG. 1).

In some embodiments, a messages UI 302 of the multi-format messaging application (e.g., second messaging application 104 of FIG. 1, also shown in FIG. 3) may be accessed via the messages button 206 described above with respect to FIG. 2. The messages button 206 may be bolded (e.g., or otherwise visually distinguished) to indicate that the messages UI 302 is currently being shown. The contacts button 204 may be available to access the contacts UI 202 described above with respect to FIG. 2 that may allow the user to navigate distinct contacts for messaging in multiple distinct messaging formats.

The user may then select, from a list of message threads available in the messages UI 302 of the multi-format second messaging application 104, a message thread 308 (e.g., message thread Marsh associated with the contact 208 for John Marsh as described above with respect to FIG. 2) in order to view the individual messages in the selected message thread 308. The user need not worry about any messaging format information when browsing their messages which are all sorted according to contact information (e.g., as shown in contacts UI 202 of FIG. 2). The user may then be presented with the individual messages between the user and the contact(s) involved in the selected message thread (e.g., message thread 308) which may each be selected in order to view the respective audio/text/video contents of each message.

As may now be clear, the multi-format, contact-centric messages UI 302 may provide many advantages to users of such a messaging UI. For example, presenting all of the messages grouped/categorized by contact(s) (e.g., contact-centric instead of format-centric) may help users manage the volume of incoming messages (e.g., in any messaging format) and also help to more efficiently use the limited screen space on mobile devices. Furthermore, such a contact-centric messages UI 302 may make it easier for a user to delete unwanted messages or groups of messages (e.g., spam or graymail) from a specific contact. Still further the contact-centric messages UI 302 may be helpful for filtering incoming messages so that they may be shown in an order that may be customized according to contact information. For example, although the messaging UI 302 may default to showing the most recently received messages at the top of the UI, it may also be used to select messages from specified contacts (e.g., family members) to the top of the UI when a message is received from such a specified contact. Still further the messages UI 302 may also take into account a number of messages received from a single contact (e.g., or contact group) within a predetermined period of time to either move the messages to the top of the messaging UI 302 and/or alert the user regarding the messages.

Data Flow

Figure 4:
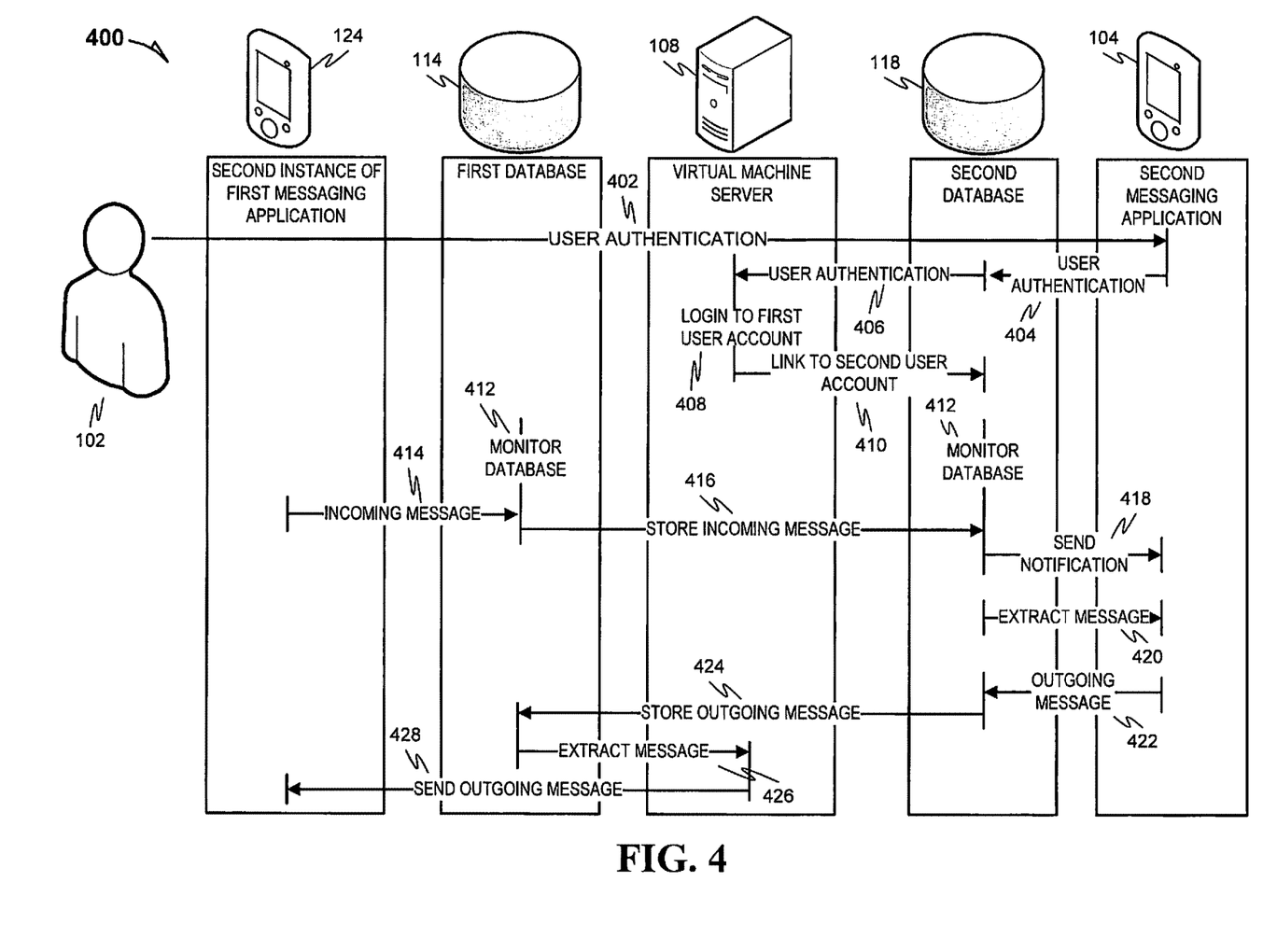
FIG. 4 is a ladder diagram illustrating a data flow, in accordance with some embodiments described herein, for multi-format messaging using a virtual machine server.

FIG. 4 is a ladder diagram illustrating a data flow 400, in accordance with some embodiments described herein, for multi-format messaging using a virtual machine server.

The elements for implementing method 400 for multi-format messaging may be similar to those of system 100 of FIG. 1. As described above, a user (e.g., user 102 of FIG. 1, also shown in FIG. 4) of a multi-format messaging application (e.g., second messaging application 104 of FIG. 1, also shown in FIG. 4), with an associated second messaging format (e.g., Android messaging format), may desire to communicate (e.g., send/receive messages) with a user of a first messaging application (e.g., iMessage) with an associated first messaging format (e.g., Apple messaging format). The user 102 may select, from a list of contacts available in a UI of the second messaging application 104 (e.g., as described above with respect to FIGS. 2-3), a contact (e.g., associated with the user of the second instance of the first messaging application 124 of FIG. 1, also shown in FIG. 4). The second messaging application 104 may then present user 102 with a user account authentication screen in the UI based on the contact selection.

At step 402, the user 102 may provide authentication information for a user account (e.g., first user account 112 of FIG. 1) associated with the first messaging application to the second messaging application 104. The first user account 112 may be an account of user 102 with the operating system (e.g., Mac OS) that executes the first messaging application (e.g., iMessage) that uses the first messaging format. However, the user 102 would not normally be able to login to an account associated with a different operating system (e.g., Mac OS) than the operating system (e.g., Android OS) that is running the second messaging application 104. As described above, to address this issue, a first instance of the first messaging application 110 may be running on a virtual machine server (e.g., VM server 108 of FIG. 1, also shown in FIG. 4). The user 102's credentials for authentication with the first user account 112 may include at least one of a username, an email address, and a password (e.g., Mac OS email and password).

At step 404, the authentication information (e.g., at least one of a username, an email address, and a password) may then be stored, by the second messaging application 104, in the second database 118 (e.g., available as part of cloud service(s) 116 of FIG. 1). In some embodiments, the authentication information may be encrypted by the second messaging application 104 before it is stored in the second database 118.

At step 406, the VM server 108 may then copy the authentication information from the second database 118 (e.g., based on monitoring the second database 118).

At step 408, the VM server 108 may use the authentication information to login to the first user account 112 (e.g., a Mac OS account) associated with the first instance of the first messaging application 110. The VM server 108 may then delete the authentication information from the second database 118, based on the authentication information being copied, so that the authentication information may be stored in the second database 118 for only a very short period of time (e.g., milliseconds).

At step 410, the second user account associated with the second messaging application 104 may then be linked (e.g., by VM server 108) to the first user account 112 associated with the first instance of the first messaging application 110 (e.g., linked in the second database 118) based on the authentication.

At step 412, the linking of the two user accounts (e.g., both associated with user 102) may further include monitoring (e.g., checking periodically by VM server 108) a first database 114 (e.g., within the virtual machine operating system) associated with the first user account 112 (e.g., and with the first instance of the first messaging application 110) for incoming messages (e.g., stored in the first message format as messages 120 associated with the first user account 112) from the second instance of the first messaging application 124 (e.g., the application being used by the person associated with the contact selected by user 102 above). Also at step 412, the linking of the first and second user accounts may also include monitoring (e.g., checking periodically by VM server 108) the second database 118 for outgoing messages from the second messaging application 104 (e.g., stored as messages 122 in the second database 118).

At step 414, the user of the second instance of the first messaging application 124 may compose and send an incoming message to user 102 via the first instance of the first messaging application 110 which user 102 is logged into. The incoming message may be sent to the first database 114 associated with the first instance of the first messaging application 110 (e.g., which may form part of VM server 108).

At step, 416, although the incoming messages are in the first message format, they may be stored (e.g., by VM server 108) in the second database 118 associated with the second user account (e.g., and with the second messaging application 104) based on an application programming interface (API) used to convert the incoming messages from the first message format to the second message format (e.g., they may be stored in the second message format as messages 122 associated with the second user account).

At step 418, a notification (e.g., a push notification) of the incoming messages being stored in the second database 118 may be sent (e.g., by the VM server 108) to the second messaging application 104.

At step 420, the second messaging application 104 may extract the incoming messages from the second database 118 based on having received the notification of the incoming messages being stored in the second database 118 by VM server 108. The second messaging application 104 may then display the incoming messages to user 102 via the messages UI described above with respect to FIG. 3 (e.g., messages UI 302).

At step 422, the user 102 of the second messaging application 104 may compose and send an outgoing message to the user of the second instance of the first messaging application 124. The outgoing message may be sent to the second database 118 associated with the second instance of the first messaging application 124.

At step, 424, although the outgoing messages are in the second message format, they may be stored in the first database 114 based on an API to convert the outgoing messages to the first messaging format (e.g., they may be stored in the first message format as messages 120 associated with the first user account 112).

At step 426, the VM server 108 may extract the outgoing messages from the first database 114 based on the monitoring of the first database 114.

At step 428, the VM server 108 may then send the outgoing messages to second instance of the first messaging application 124 so that the user of the second instance of the first messaging application 124 may view the outgoing messages as if they had been sent by a fellow user of the first messaging application.

Methods

Figure 5:
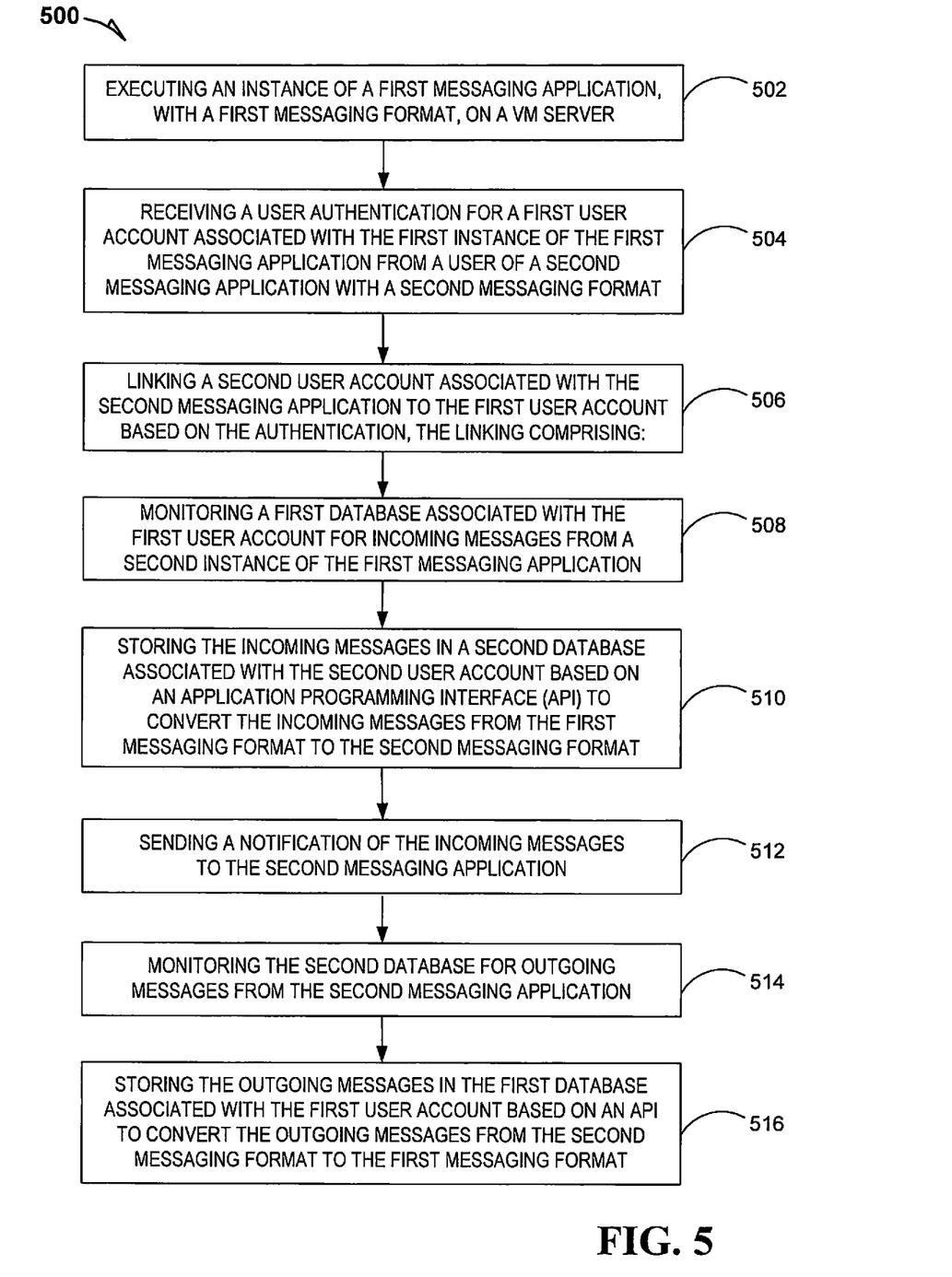
FIG. 5 is a flow diagram illustrating a method, in accordance with some embodiments described herein, for multi-format messaging using a virtual machine server.

FIG. 5 is a flow diagram illustrating a method 500, in accordance with some embodiments described herein, for multi-format messaging using a virtual machine server (e.g., VM server 108 of FIG. 1).

At operation 502, executing a first instance of a first messaging application (e.g., first instance of first messaging application 110 of FIG. 1), with a first messaging format, on a virtual machine server (e.g., VM server 108 of FIG. 1).

At operation 504, receiving a user authentication for a first user account (e.g., first user account 112 of FIG. 1) associated with the first instance of the first messaging application from a user of a second messaging application (e.g., second messaging application 104 of FIG. 1) with a second messaging format.

At operation 506, linking a second user account associated with the second messaging application to the first user account based on the authentication. The linking may include:

At operation 508, monitoring a first database (e.g., first database 114 of FIG. 1) associated with the first user account for incoming messages from a second instance of the first messaging application (e.g., second instance of the first messaging application 124 of FIG. 1).

At operation 510, storing the incoming messages in a second database (e.g., second database 118 of FIG. 1) associated with the second user account based on an application programming interface (API) to convert the incoming messages to the second messaging forma At operation 512, sending a notification of the incoming messages to the second messaging application.

At operation 514, monitoring the second database associated with the second user account for outgoing messages from the second messaging application.

At operation 516, storing the outgoing messages in the first database associated with the first instance of the first messaging application based on an API to convert the incoming messages to the first messaging format.

Figure 6A:
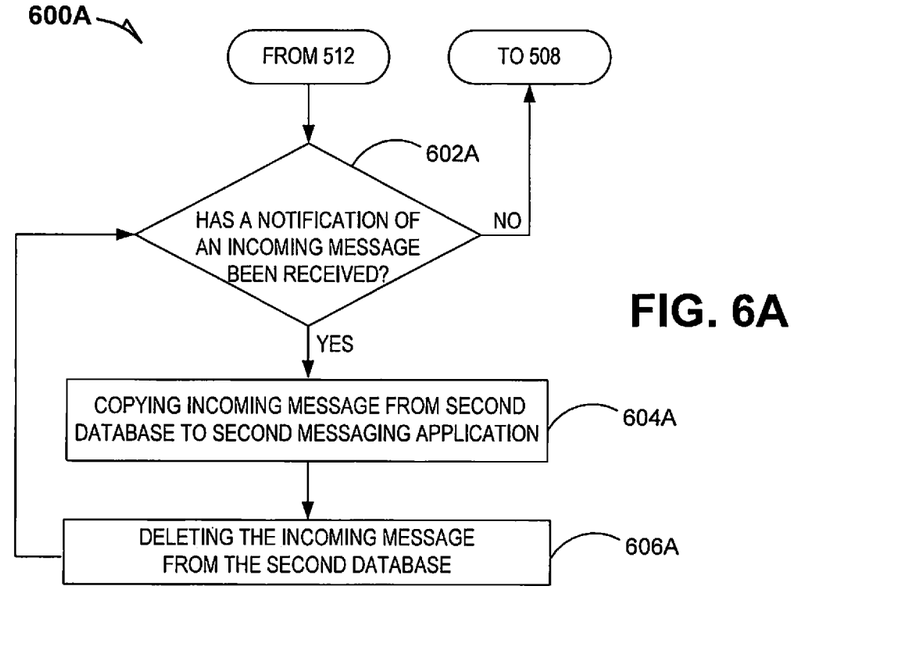
FIGS. 6A and 6B are flow diagrams illustrating example methods, in accordance with some embodiments described herein, for multi-format messaging using a virtual machine server.

FIG. 6A is a flow diagram illustrating a method 600A, in accordance with some embodiments described herein, for multi-format messaging using a virtual machine server (e.g., VM server 108 of FIG. 1).

The linking of the first and second user accounts may further include sending the respective incoming messages and outgoing messages to their intended recipients (e.g., user 102 and the person associated with the contact selected by user 102 above).

At operation 602A (which may follow from operation 512 of method 500 of FIG. 5), it may be determined whether a notification of the incoming messages has been received by the second messaging application 104 (e.g., from VM server 108). The method 600A may return to operation 508 of method 500 of FIG. 5 based on a determination that the notification of the incoming messages has not been received.

At operation 604A, copying the incoming messages from the second database (e.g., they are stored as part of messages 122 in second database 118 of FIG. 1) to the second messaging application so that the user (user 102 of FIG. 1) may view them in a messages UI (e.g., messages UI 302 of FIG. 3) of the second messaging application 104.

At operation 606A, deleting the incoming messages from the second database 118 based on the copying of the incoming messages at operation 604A after which method 600A may return to operation 602B to check for the receipt of more notifications of incoming messages by the second messaging application 104.

Figure 6B:
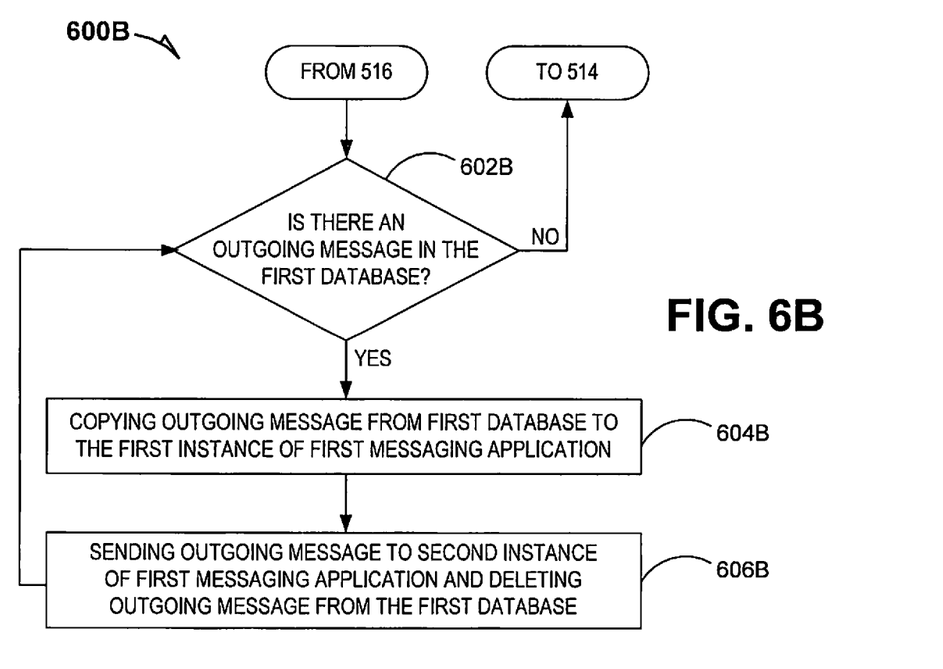

FIG. 6B is a flow diagram illustrating a method 600B, in accordance with some embodiments described herein, for multi-format messaging using a virtual machine server (e.g., VM server 108 of FIG. 1).

At operation 602B (which may follow from operation 516 of method 500 of FIG. 5), it may be determined whether there are outgoing messages in the first database 114 (e.g., by the VM server 108). The method 600B may return to operation 514 of method 500 based on a determination that there are no outgoing messages in the first database 114.

At operation 604B, copying the outgoing messages from the first database 114 (e.g., they are stored as part of messages 120 in first database 114 of FIG. 1) to the first instance of the first messaging application 110 executing on the VM server 108.

At operation 60613, sending the outgoing messages to the second instance of the first messaging application 124 and then deleting the outgoing messages from the first database 114 based on the sending of the outgoing messages and then method 600A may return to operation 602B to check for more outgoing messages in the first database 114.

Machine Architecture

Figure 7:
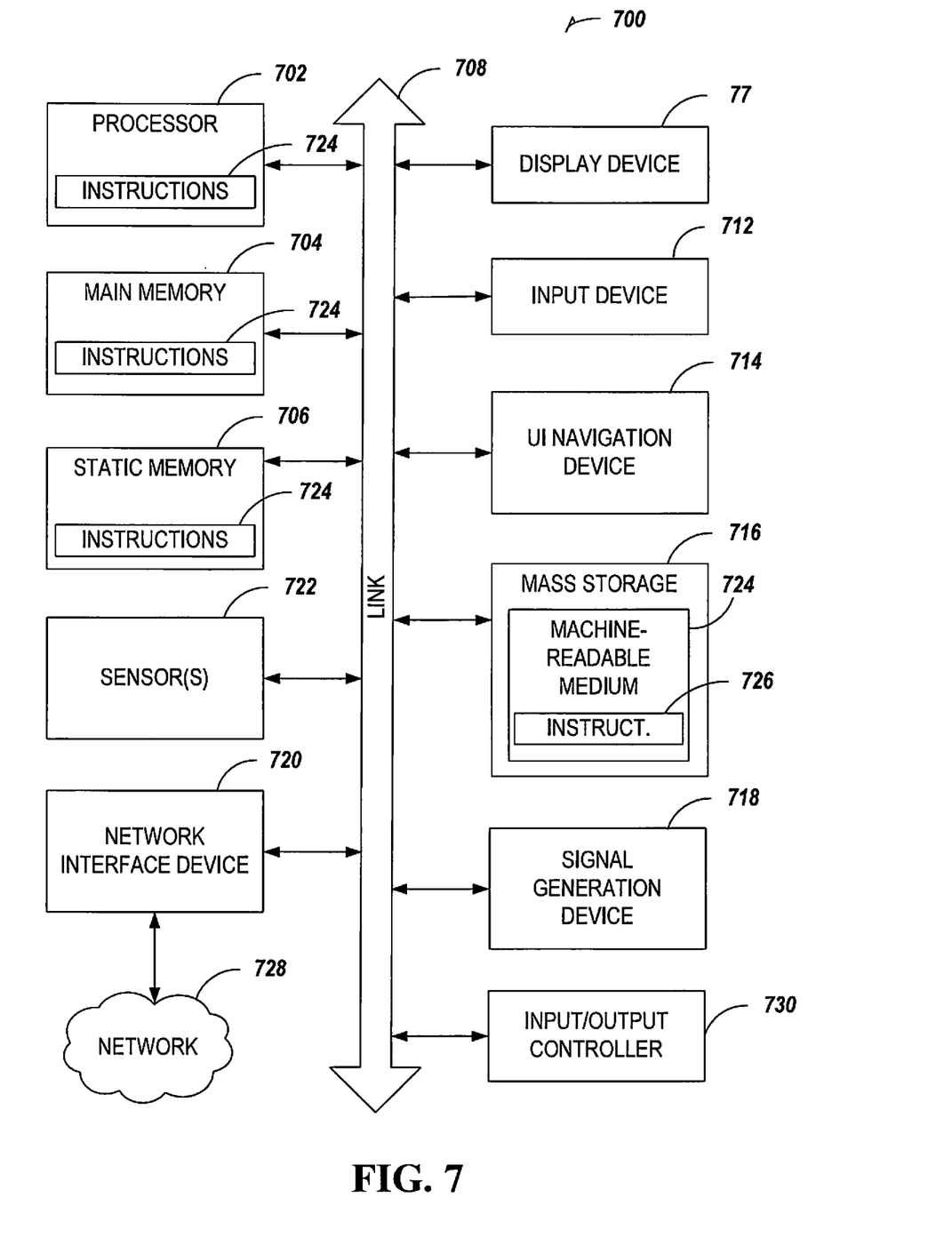
FIG. 7 is a diagrammatic representation of machine, in the example form of a computer system, within which a set of instructions may be executed to cause the machine to perform any of the methodologies discussed herein.

FIG. 7 is a block diagram illustrating a machine in the example form of a computer system 700, within which a set or sequence of instructions may be executed to cause the machine to perform any one of the methodologies discussed herein, according to an example embodiment.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform methods as discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors 722, such as a global positioning system (GPS) sensor, accelerometer, gyrometer or other sensor.

The storage device 716 includes a machine-readable medium 724 on which is stored one or more sets of data structures and instructions 726 (e.g., software) embodying or utilized by any one or more of the methodologies or functions described herein. The instructions 726 may also reside, completely or at least partially, within the main memory 704, static memory 706, and/or within the processor 702 during execution thereof by the computer system 700, with main memory 704, static memory 706, and processor 702 comprising media.

While the machine-readable medium 724 is illustrated in an example embodiment to be a single medium, the term "machine-readable medium" may include a single medium or multiple media (e.g., a centralized or distributed database, and/or associated caches and servers) that store the one or more instructions 726. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 726 may further be transmitted or received over a communications network 728 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 700 may also include an input/output controller 730 to receive input and output requests from the at least one central processor 702, and then send device-specific control signals to the device they control. The input/output controller 730 may free the at least one central processor 702 from having to control each separate kind of device.

The invention claimed is:

1. A method for transmitting messages between incompatible messaging applications, the method comprising:
   executing a first instance of a first messaging application, with a first messaging format, on a virtual machine server;
   receiving a user authentication for a first user account associated with the first instance of the first messaging application from a user of a second messaging application with a second messaging format;
   linking a second user account associated with the second messaging application to the first user account based on the authentication, the linking comprising:
      monitoring a first database associated with the first user account for incoming messages from a second instance of the first messaging application;
      storing the incoming messages in a second database associated with the second user account based on an application programming interface (API) to convert the incoming messages from the first messaging format to the second messaging format;
      sending a notification of the incoming messages to the second messaging application;
      monitoring the second database for outgoing messages from the second messaging application; and
      storing the outgoing messages in the first database based on an API to convert the outgoing messages from the second messaging format to the first messaging format.

2. The method of claim 1, further comprising:
   copying the incoming messages from the second database to the second messaging application based on receipt of the notification;
   copying the outgoing messages from the first database to the first instance of the first messaging application; and
   sending the outgoing messages to the second instance of the first messaging application.

3. The method of claim 2, further comprising:
   deleting the incoming messages from the first database based on the storing of the incoming messages in the second database; and
   deleting the outgoing messages from the second database based on the storing of the outgoing messages in the first database.

4. The method of claim 3, further comprising:
   deleting the incoming messages from the second database based on the copying of the incoming messages; and
   deleting the outgoing messages from the first database based on the sending of the outgoing messages.

5. The method of claim 1, wherein storing the messages in the first database and the second database further comprises encrypting the messages.

6. The method of claim 1, wherein monitoring the second database for outgoing messages comprises checking for the outgoing messages in the second database according to a schedule.

7. The method of claim 1, wherein the authentication comprises at least one of a username, an email address, and a password.

8. The method of claim 7, further comprising:
storing the at least one of a username, an email address, and a password in the second database;
copying the at least one of a username, an email address, and a password from the second database to the virtual machine server; and
deleting the at least one of a username, an email address, and a password from the second database based on their respective copying.

9. The method of claim 7, wherein storing the at least one of a username, an email address, and a password in the second database further comprises encrypting the at least one of a username, an email address, and a password.

10. The method of claim 1, wherein the authentication comprises a two-factor authentication.

11. A system comprising one or more processing devices communicatively coupled to one or more storage devices in order to transmit messages between incompatible messaging applications, the one or more processing devices to:
execute an instance of a first messaging application, with a first messaging format, on a virtual machine server;
receive a user authentication for a first user account associated with the first instance of the first messaging application from a user of a second messaging application with a second messaging format;
link a second user account associated with the second messaging application to the first user account based on the authentication, the linking comprising the one or more processing devices further to:
monitor a first database associated with the first user account for incoming messages from a second instance of the first messaging application;
store the incoming messages in a second database associated with the second user account based on an application programming interface (API) to convert the incoming messages from the first messaging format to the second messaging format;
send a notification of the incoming messages to the second messaging application;
monitor the second database for outgoing messages from the second messaging application; and
store the outgoing messages in the first database based on an API to convert the outgoing messages from the second messaging format to the first messaging format.

12. The system of claim 11, the one or more processing devices further to:
copy the incoming messages from the second database to the second messaging application based on receipt of the notification;
copy the outgoing messages from the first database to the first instance of the first messaging application; and
send the outgoing messages to the second instance of the first messaging application.

13. The system of claim 12, the one or more processing devices further to:
delete the incoming messages from the first database based on the storing of the incoming messages in the second database; and
delete the outgoing messages from the second database based on the storing of the outgoing messages in the first database.

14. The system of claim 13, the one or more processing devices further to:
delete the incoming messages from the second database based on the copying of the incoming messages; and
delete the outgoing messages from the first database based on the sending of the outgoing messages.

15. The system of claim 11, wherein to store the messages in the first database and the second database, the one or more processing devices are further to encrypt the messages.

16. The system of claim 11, wherein to monitor the second database for outgoing messages, the one or more processing devices are further to check for the outgoing messages in the second database according to a schedule.

17. The system of claim 11, wherein the authentication comprises at least one of a username, an email address, and a password.

18. The system of claim 17, the one or more processing devices further to:
store the at least one of a username, an email address, and a password in the second database;
copy the at least one of a username, an email address, and a password from the second database to the virtual machine server; and
delete the at least one of a username, an email address, and a password from the second database based on their respective copying.

19. The system of claim 17 wherein to store the at least one of a username, an email address, and a password in the second database the one or more processors are further to encrypt the at least one of a username, an email address, and a password.

20. The system of claim 11 wherein the authentication comprises a two-factor authentication.

* * * * *